2,981,525

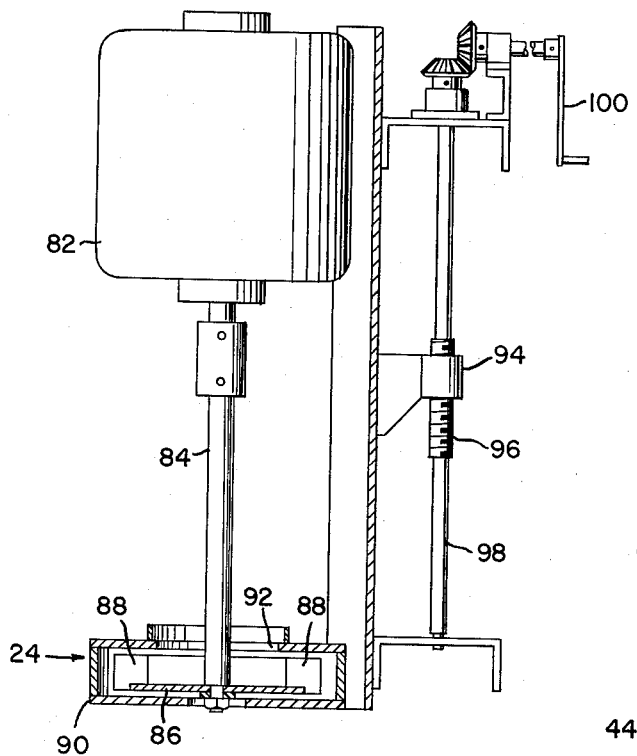
Fig. 4.
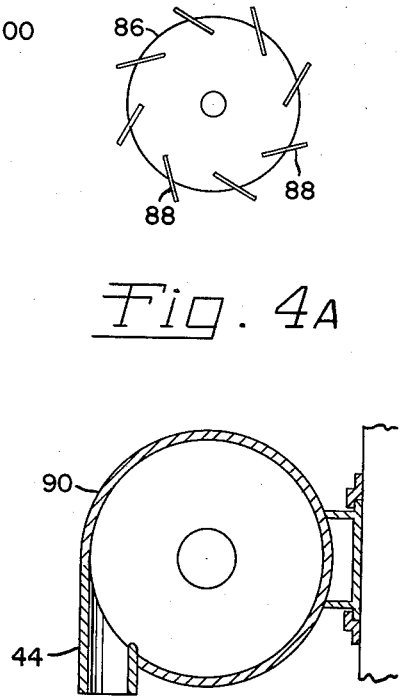
Fig. 4A.
Fig. 5.
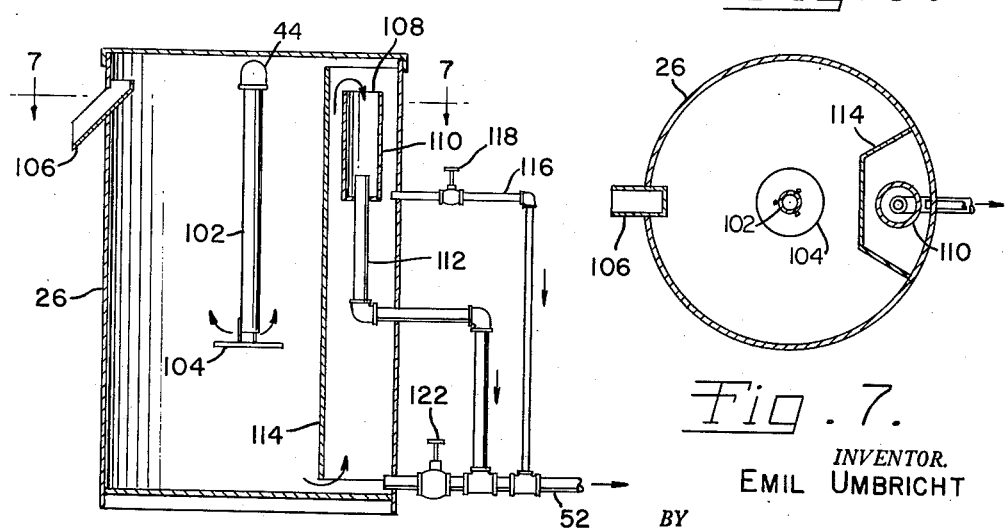
Fig. 6.
Fig. 7.
INVENTOR.
EMIL UMBRICHT
BY
Curtis, Morris & Safford
ATTORNEYS United States Patent Office 2,981,525
Patented Apr. 25, 1961

APPARATUS FOR HANDLING OVERSPRAY PAINT

Emil Umbricht, Jackson, Mich., assignor to Ajem Laboratories, Inc., Detroit, Mich.

Filed Dec. 31, 1954, Ser. No. 479,039

3 Claims. (Cl. 261—3)

This invention relates to apparatus for handling overspray paint, and particularly to the recovery of overspray paint in liquid or semi-liquid form.

In the copending application of Raymond H. Harbin and Orlan M. Arnold, entitled "Method for Handling Overspray Materials," Serial No. 479,032, filed December 31, 1954, there is described a method of recovering overspray paint by substituting less volatile solvents for those originally in the paint material and floating the collected overspray material as a continuous liquid phase on the surface of an aqueous olution. The present invention provides apparatus for efficiently and effectively handling the overspray material in a liquid form.

The collection of overspray material is important because in many instances more of the sprayed paint results in overspray than is used to coat the objects being sprayed. This overspray material, if not collected efficiently, will coat the parts of the spraying apparatus, decreasing its effectiveness and making it necessary to disassemble and clean the apparatus by hand.

Various arrangements of devices for washing the paint particles from the air and collecting them have been proposed. One of the most commonly used methods is one in which the paint particles are captured in a water solution which contains surface active agents that kill the overspray material. In killing the overspray paint material its sticky, adherent coat-forming characteristics are removed so that the material does not tend to stick to, coat over, cake upon or gum up exposed surfaces of the apparatus in contact with aqueous solution holding the killed paint material. The killed paint material may then remain in either an inert liquid or an inert granular or lumpy solid form. In this one common method, the chemical agents in the aqueous solutions act upon the overspray material while it is being killed to coagulate, and float it as small particles and small lumps of inert material on the surface of the aqueous solution so that it can be easily scooped out of the aqueous solution. Such systems are suitable for most pigment type paint materials but have not been found to operate satisfactorily with certain types of paint, for example those which have a base of bitumenous materials. Such paints are not readily killed, that is their sticky, adherent, coating characteristics can not be removed, and usually they form a gummy mass that is difficult to handle.

By the use of apparatus incorporating the present invention, such bitumenous materials can be handled readily and disposed of easily. The same apparatus can be used to handle other types of killed paint materials which form a continuous liquid phase on the surface of the collecting solution.

In carrying out the invention, a solvent of higher boiling point which will not be vaporized under usual operating conditions of the spray booth is substituted for the volatile vehicle of the paint. This less volatile solvent becomes a substitute solvent or dispersing media for the original vehicle carrying the pigment, resin, and other materials. This higher boiling solvent has the ability to dissolve or disperse the paint selectively in itself, and is immiscible with the aqueous substrate media, although it may be dispersed temporarily by mechanical means in the aqueous substrate.

Various objects and advantages of this invention will be made clear by consideration of the following example of a spray booth system incorporating the invention considered in conjunction with the accompanying drawings, in which:

Figure 4 is an elevational view illustrating the skimming pump which forms part of the spray booth system shown in Figures 1 and 2;

Figure 4A is a plan view of the impeller used in the pump shown in Figure 4;

Figure 5 is a horizontal sectional view showing the scroll of the pump in Figure 4;

Figure 6 is a sectional view of a collection tank used in conjunction with the spray booth system of Figures 1 and 2; and Figure 7 is a sectional view of the collection tank taken along lines 7—7 of Figure 6.

Figure 1:
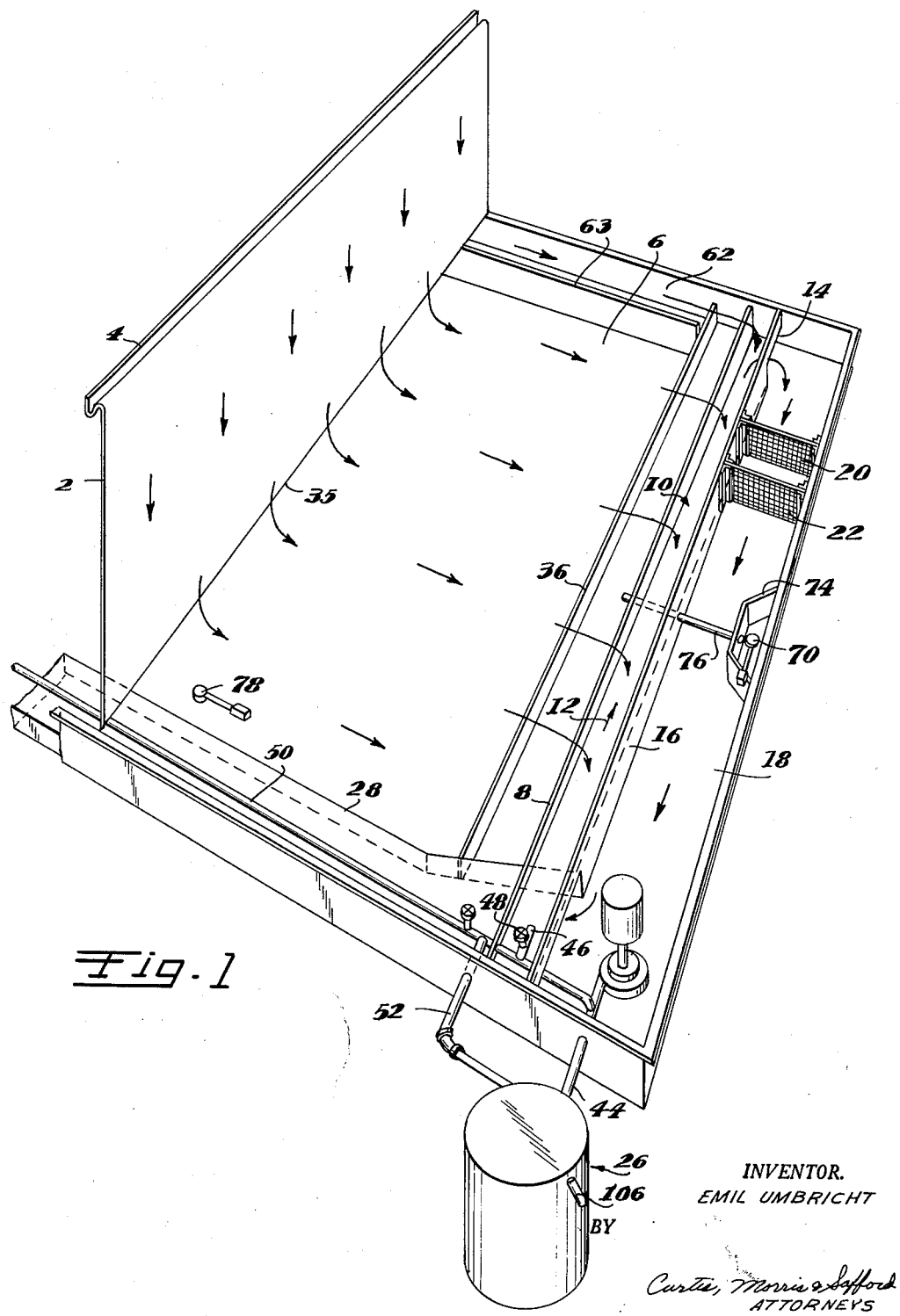
Figure 1 is a diagrammatic perspective representation of a portion of an overspray collecting system incorporating the invention.

In most spray booth systems air is drawn across the article being sprayed and into the internal portions of the booth, carrying with it the overspray paint materials. This air is washed to remove the paint particles which then are collected in the recirculating aqueous solution of the spray booth. In addition, the aqueous solution flows in the form of a continuous film over a vertical wall so that part of the overspray is collected by the impingement of the paint particles upon this water curtain. In the arrangement shown in Figure 1, a vertical water curtain or sheet 2 is covered continuously on the forward side with a film of the aqueous solution which overflows from a trough 4 extending along the upper edge of the curtain 2. The water solution is continuously pumped into this trough so that it flows over the forward surface of the water curtain 2 and is received in a tank 6.

This water solution contains suitable paint-killing materials which cause the paint material to collect on the surface of the aqueous solution as a continuous killed liquid phase devoid of substantially all of its sticky, adherent, coat-forming characteristics. For example, the aqueous solution in the spray booth, is described more fully in the above-identified copending application of Raymond H. Harbin and Orlan M. Arnold, and may include a first reagent comprising 95 parts by weight of sodium metasilicate hydrate ($Na_2SiO_3 \cdot 5H_2O$); 4.8 parts of anhydrous trisodium phosphate ($Na_3PO_4$); 0.2 part of light lubricating oil such as Tellus Oil 33; and a trace of antifoam agent such as silicone oil. This reagent may be added to water in the spray booth in the approximate amount of one pound to 32 gallons of water. In addition, a liquid composition may be formed of approximately 84 parts by volume of high-boiling, high-flash aromatic solvent; 14 parts of fuel oil; 0.75 part of glyceryl mono oleate; and 0.25 part of anhydrous nonionic detergent such as alkyl aryl polyether alcohol. The resulting liquid material may be added to the spray booth in the approximate amount of one gallon to approximately 128 gallons of water. Any other suitable paint-killing materials can be used.

This liquid in the tank 6 moves forwardly in the direction of the arrows of Figure 1 and over the top of a submerged weir 36 and then over a higher weir 8 which extend transversely across the tank. This liquid carries the freshly sprayed paint which has missed the object being sprayed, and which now forms a continuous liquid surface phase that flows over the top of the weir 8 into a sluice trough 10. This sluice trough is a relatively narrow trough, for example 8 to 12 inches in width, that extends the full width of the spray booth tank 6. Preferably the bottom of this sluice trough is sloped to provide adequate velocity for the liquid moving along it, and it is preferred that this velocity be in excess of three feet per minute. In this illustration the spray booth water and the paint media move along the sluice trough in the direction of the arrow 12 and pass through an opening 14 in the lower end-portion of a transverse baffle 16 so that the liquid makes a 180° turn from the sluice trough 10 into a sludge collection trough 18. The water and the suspended material are carried toward the left in the sludge collection trough 18 through one or more screens, indicated respectively at 20 and 22. The liquid level in the sludge collection trough is below that in the tank 6 to provide the desired velocity of flow.

In practice it has been found that the liquid level in the sludge collection trough 18 may be as much as six inches below the level in the tank 6 under satisfactory operating conditions. In the sludge collection trough 18 most of the paint material is floated in at least a semi-killed fluidized condition as a surface layer, but some of the finer suspension of the paint materials may still be in the bulk of the solution because it has not yet had time to rise to the surface such as would occur on the standing of the solution. A skimming and recirculating pump, generally indicated at 24, and which will be described in more detail later, is arranged to skim the surface layer from the material in the collection trough 18 and to pump a portion of this material into a collection tank 26 and also to recirculate a portion of this material as will be explained later.

The material in the collection trough 18 is also recirculated by means of a submerged tunnel 28 which connects into the centrifugal or other type air washers. These air washers may, for example, be of the type described in the U.S. patent application of Emil Umbricht, Serial No. 444,012, filed July 19, 1954, and now issued as Patent No. 2,889,005, dated June 2, 1959, and which contain pumps that will provide the desired flow velocity through the system described above.

Figure 2:
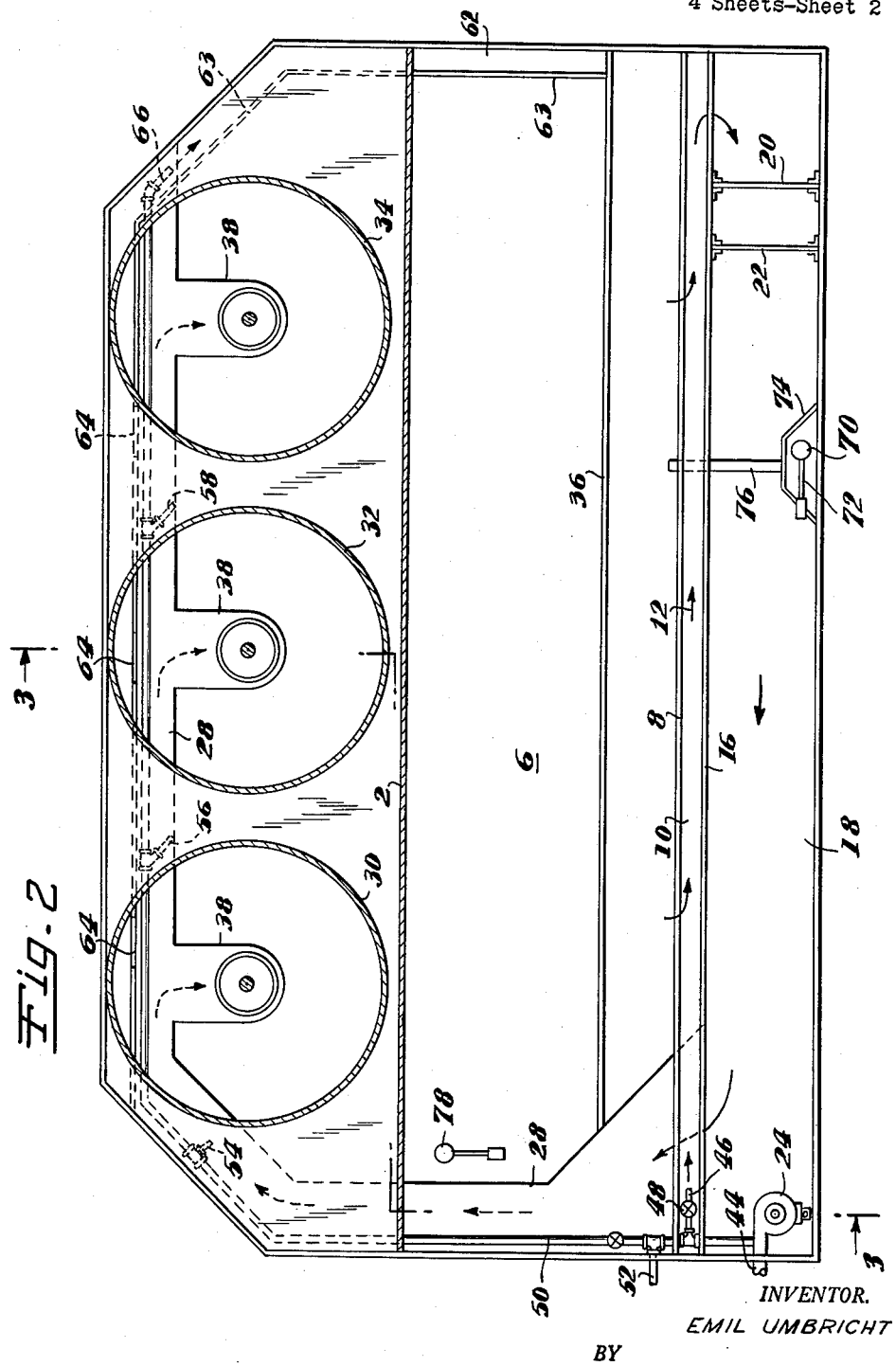
Figure 2 is a diagrammatic plan view, partially in section, taken along the line 2—2 in Figure 3 showing a spray booth system incorporating the invention.
Figure 3:
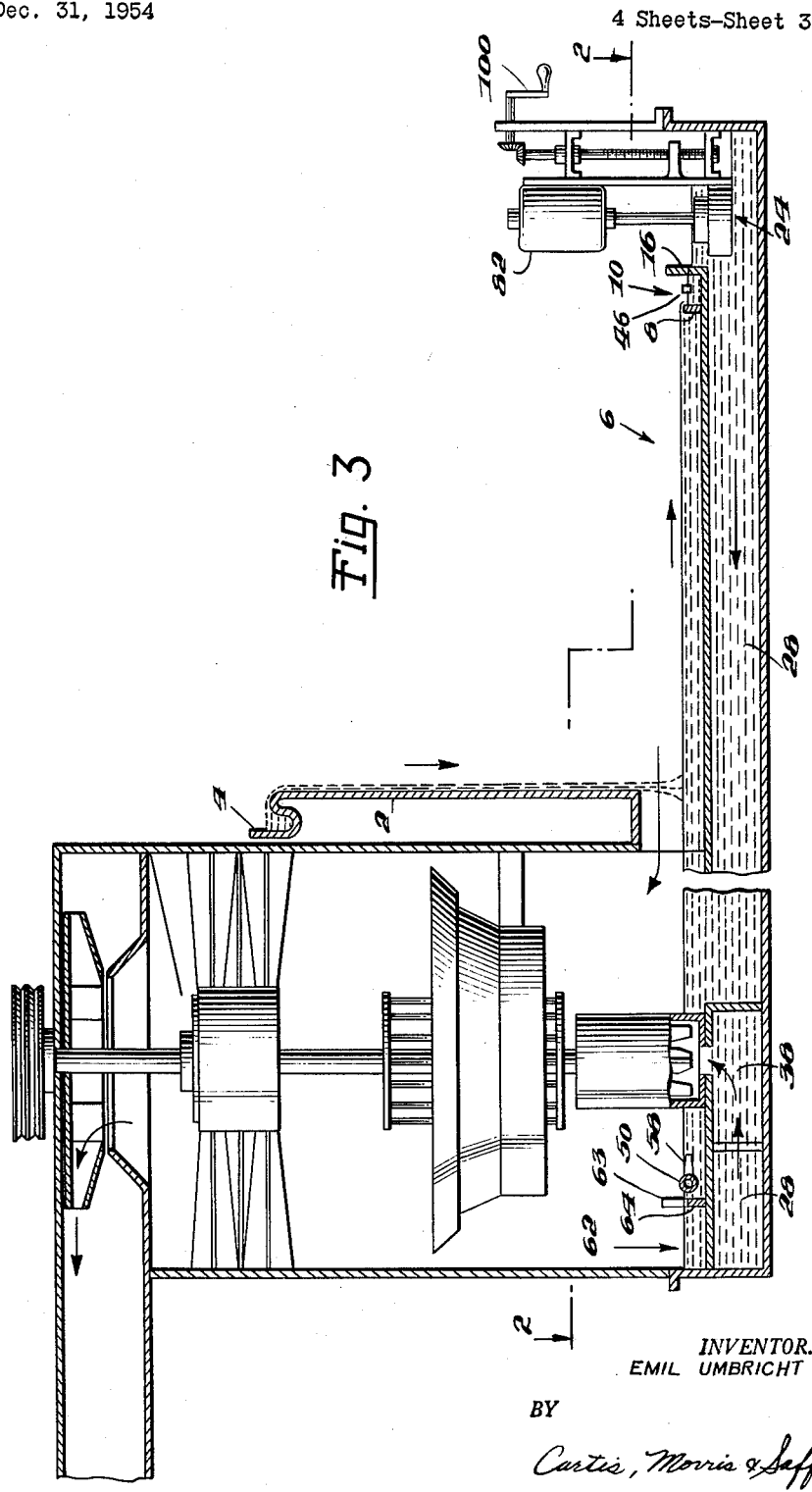
Figure 3 is an elevational sectional view taken along the line 3—3 of Figure 2.

A typical system incorporating the present invention is shown somewhat more fully in Figure 2, in which parts corresponding to those of Figure 1 have been indicated by similar numerals. In this drawing three of the centrifugal type air washers are indicated respectively at 30, 32, and 34, and may be similar to the ones referred to in the above-identified application Serial No. 444,012. The water curtain 2 is positioned immediately forward of these centrifugal washers so that water from the curtain 2 and also from the centrifugal washers 30, 32, and 34 flows forwardly through the tank 6. A suitable opening 35 (see Figure 1) is provided beneath the curtain 2 so that water from the centrifugal air washers is permitted to move under the curtain and forwardly across the tank 6, and the air to be washed is drawn into these washers 30, 32 and 34 through the opening 35 beneath the curtain 2.

As in the arrangement described before, a weir 8 is provided which forms one wall of the sluice trough 12. In addition to the weir 8, a submerged weir 36 is provided which extends transversely the full width of the tank 6. This weir 36 is provided to minimize the flow of liquid from the front of the tank 6 toward the rear when the spray booth water is being drawn from the rear section of the spray booth. Thus, during desludging operations, this submerged weir 36 assists in keeping the suspended sludge on the liquid surface from migrating backward.

The screens 20 and 22 are formed preferably of screen having about a one-inch mesh and are removable. Ordinarily only one screen is used at a time so that the second screen is introduced when the first screen is clogged with solid debris. These screens 20 and 22 serve two purposes, one of which is to stop floating solid debris, such as paper, tape, or other materials which may have fallen into the tank, and secondly to hold up any solid cakes of paint which may have accumulated in the booth under incorrect operating conditions. These chunks of paint are caught by the screen and caused to dissolve in the aqueous solution so that they are fluidized and readily passed through the pump 24. It will be noted in this view that the submerged tunnel 28 extends all the way across the rear of the spray booth and is connected by tunnel extensions 38 to the pumping mechanisms of the centrifugal type air washers.

The skimming and recirculation pump 24, it will be noted, is provided with an outlet pipe 44 which extends into the separation tank 26 (not shown in this view) and is connected also to an outlet 46 so that a portion of the material can be recirculated into the sluice trough 12 under the control of a valve 48. The liquid from the pump 24 also is recirculated through a pipe 50, along with liquid returned from the separation tank 26, through the pipe 52, to the rear of the spray booth where it is discharged through outlets 54, 56, and 58 to assist in maintaining a flow of the liquid from the rear of the tank 6 toward the forward sludge-collecting trough 18. In addition, a trough 62 can be provided, if desired, to further assist in the forward movement of materials from the rear of the tank 6. This trough 62 has an upwardly extending partition 63, as indicated by the double lines, which extends above the normal level of the liquid in the tank 6. The top of this partition is cut down to a level just below the liquid surface at a number of spaced points to provide a number of weir sections 64 along the rear of the tank which permit the liquid at the rear of the tank to flow rearwardly into the trough 62. This material then moves forwardly in the trough 62, and this movement is assisted by discharging liquid from the pump 24 through an outlet 66 in the trough 62.

In order to control the level of liquid in the system, a low-level float control, generally indicated at 68, is provided in the sludge-collection trough 18 and is arranged to be free from clogging. This float controls the fresh water fed into the front section of the spray booth and maintains a proper level of the liquid so that the liquid will not get down below the top of the submerged tunnel 28 and cause air to be pulled through the tunnel, resulting in an improper operation of the centrifugal air washers 30, 32, and 34. Moreover, if the water level in the sludge collection trough 18 is allowed to become too low, the floating sludge will be carried back to the tunnel 28 and dispersed through the air washing units. Thus, the float 68 controls the level of liquid in the front trough while the spray booth is in operation. This control unit includes a float 70 supported by a hinged arm 72 that is arranged by means of conventional type mechanisms (not shown) to maintain the liquid level at the proper height. This float is positioned in a compartment 74 that is closed on the sides and bottom with the exception of a hole approximately 1 inch in diameter near the bottom which connects into a pipe 76 that opens into the quiet section of the tank 6 immediately to the rear of the weir 8. The liquid for the operation of the float 70 flows through the pipe 76 into the compartment 74 and is fairly free from sludge. The upper portion of the compartment 74 is opened into the sludge collection trough 18 at the level at which the liquid is to be maintained so that there is at least an intermittent flow through the pipe 76, thus tending to prevent the unit from becoming clogged.

In addition, an upper-float level device is provided in the tank 6, as indicated diagrammatically at 78. When the spray booth is standing there is substantial loss of liquid by evaporation as well as deaeration. When the air washers are started the water level may drop too low in the front sludge collection trough 18, making it necessary to introduce water quickly by manual control of a large opening from the water supply, or a regulating device to maintain the correct liquid level during standing time. The float control 78 is provided for this purpose. A suitable protection shield (not shown) over the top of the float 78 is provided so that materials dropping into the tank will not contaminate the float mechanism.

The pump 24 may be generally of the construction illustrated in Figures 4, 4A and 5. This pump is similar to that described by Emil Umbricht in U.S. patent application Serial Number 357,450, filed May 26, 1953, now Patent No. 2,890,660 of June 16, 1959, so that all of the bearings are above the level of the liquid. Reference is made to that application for this portion of the pump construction. The pump is driven by a motor 82 which is directly connected by a vertical shaft 84 to an impeller plate 86. This skimming pump differs from that shown in the above application in that the impeller plate 86 carries a number of upwardly-extending angularly-positioned vanes 88 (best shown in Figure 4). The impeller plate 86 is positioned within a housing 90 which is provided with an outlet pipe 44. The liquid to be pumped enters the housing 90 from above through an opening 92 around the shaft 84.

It is preferable that this pump be positioned to skim the fluidized paint material from the surface of the liquid and at the same time to carry with it a certain amount of the aqueous substrate media. Accordingly, the pump is mounted so that its position can be adjusted vertically to give the best operating condition. To this end, the motor 82 and the housing 90 are connected to a bracket 94 which has an internally threaded member in engagement with a feed screw 96. This feed screw is secured to a vertical shaft 98 arranged to be operated by rotation of a handle 100 so that the entire pump mechanism can be raised or lowered manually. Any other suitable mechanism for raising or lowering the pump can be employed.

Further details of the sludge collection tank are shown in Figures 6 and 7. This separation tank permits continuous separation of the paint from the substrate and the return of the substrate to the spray booth. The desludging pump 24 is connected to the pipe 44 which enters the main tank 26 through the top or through the side near the top rim of the tank. This inlet pipe goes across to the center of the tank and has a downward extension 102 which extends about three-fifths of the way toward the bottom of the tank 26. In order to prevent excessive mixing of the incoming paint material with the material already in the tank, a baffle plate 104 is provided immediately beneath the outlet of the pipe 102.

The fluidized paint material collects on the surface of the liquid within the tank 26 and flows into a sludge outlet chute 106 from which suitable disposal of the paint material is made. The return pipe 52 returns the substrate material to the spray booth system and controls the level of the liquid within the tank 26. An overflow outlet 108 is provided within the tank 26 to control the level of the liquid. This overflow comprises a cup-shaped member 110 which is connected to a return pipe 112 that is in turn connected into the pipe 52. The top of this overflow cup member is just slightly below the inlet to the sludge outlet chute 106 as shown in Figure 6. The cup 110 and the pipe 112 are surrounded by a vertically-extending shield 114 aranged to prevent the fluidized paint material from being returned through the overflow. The shield 114 is open near the bottom of the tank 26 so that it is filled with clear substrate material. The upper end of the shield 114 is above the level of the liquid in the tank 26. Another outlet pipe 116 opens into the interior of the shield 114 substantially at the base of the overflow cup 110. This pipe 116 also connects into the pipe 52 and the flow of liquid through it is controlled by a valve 118. The pipe 52 is also connected into the interior of the separation tank 26 near the bottom, and the flow of liquid through this outlet is controlled by a valve 122. Thus, as the liquid is pumped into the separation tank 26 there can be a continuous overflow of substrate up through the interior of the partition 114 and through the overflow cup 110 back to the spray booth. When the liquid, however, is being pumped into the tank very rapidly, the overflow cup 110 may not accommodate all of the liquid and the valve 118 is opened part way to provide an additional return flow for the substrate media. In addition, the valve 122 may be opened to permit still further flow of the return liquid. It has been found from experience that partial opening of the valve 118 and the valve 122 allows a very large volume of paint and substrate to be pumped into the separation tank with a resultant smooth controlled stream of paint coming out the overflow sludge chute while the substrate flows back to the booth. The valves 118 and 122 also enable the flow of sludge in the chute 106 to be stopped, such as when changing receptacles without interrupting the operation of the desludging pump 24, so that no undesirable accumulation of sludge takes place in the spray booth. By opening the valve 118 and the valve 122 fully, the liquid level within the separation tank 26 drops below the level of the chute 106 so that delivery is interrupted. The flow of paint can be restored by closing the valve 118 and the valve 122 to the proper degree to control and restore the flow of recovered paint out of the chute 106.

What is claimed is:

1. In a spray booth for collecting and handling overspray paint materials in which recirculating liquid media is arranged to capture, kill, and float in fluidized form the overspray paint materials, apparatus for handling the liquid substrate and selectively removing the upper portion thereof comprising a tank having a large horizontal cross sectional area, means providing an upright surface with an opening therebelow, said wall adaptable to receive liquid media of the upper portion of said wall for forming a liquid curtain passing down over said surface and across said opening, said tank containing said liquid media and having an exposed surface for trapping overspray paint materials, said tank extending beneath said upright surface for receiving the liquid media therefrom and being adapted to hold a substantial depth of said liquid media, a weir extending along one edge of said tank in front of said upright surface having a horizontal top edge positioned just below said predetermined level, a weir trough extending along parallel with said weir for catching the upper portion of the liquid passing over said weir, said trough having a downwardly sloping bottom, a sludge collection trough extending along parallel with said weir trough and communicating therewith at the low end of the weir trough, a skimming pump having an entrance port communicating with the liquid media in said collection trough near the high end of the weir trough, a settling tank connected to the output of said skimming pump, means defining a tunnel communicating with the liquid media in said collection trough near the entrance port of said pump, said tunnel passing beneath said weir trough and beneath said weir and extending back to a position behind said upright surface, and a centrifugal type air washer behind said upright surface for drawing air back through the upper portion of said opening and having a pumping mechanism communicating with said tunnel, the used liquid media returning from said air washer through the lower portion of said opening and into said tank.

2. Apparatus as claimed in claim 1 wherein said skimming pump is a centrifugal type pump having a rotatable impeller, a vertical shaft extending up from said impeller, an electric motor secured to the upper end of said shaft, a housing around said impeller having an intake port around said shaft above said impeller, said housing defining a continuous upstanding horizontal lip completely surrounding said intake port and a supporting frame secured to said pump and motor and including a continuously adjustable means for changing the vertical height of said pump.

3. In a spray booth for collecting and handling overspray paint materials in which recirculating liquid media is arranged to capture, kill, and float in fluidized form the overspray paint materials, apparatus for handling the liquid media and removing the upper layer therefrom comprising a container having a tank portion with a large horizontal area adapted to hold a substantial depth of said liquid with its surface at a predetermined level, a sluice trough, a weir having a top edge of substantially uniform height spaced just below said surface level and separating said sluice trough from said tank portion, a sludge collection trough connected to receive liquid from said sluice trough, a pump in said collection trough arranged to skim the upper layer from the liquid therein, means for recirculating liquid from the sludge collection trough into said tank portion, water inlet control means opearted by a float positioned in said sludge collection trough, a protective compartment surrounding said float and protecting it from the sludge in said collection trough, the interior of said compartment communicating with said collection trough at the desired level of sludge therein, and an inlet pipe having its intake end behind said weir communicating with the liquid media below said upper layer, said pipe supplying the interior of said compartment with relatively clean liquid, whereby said float is bathed in clean liquid and yet is responsive to the level of the sludge in said collection trough.

References Cited in the file of this patent
UNITED STATES PATENTS

| | | |
|---|---|---|
| 48,559 | Kaufman | July 4, 1865 |
| 1,109,103 | Baum | Sept. 1, 1914 |
| 1,464,071 | Glover | Aug. 7, 1923 |
| 1,800,965 | Spalding | Apr. 14, 1931 |
| 1,821,772 | Ruthman | Sept. 1, 1931 |
| 2,006,727 | Ardrey | July 2, 1935 |
| 2,124,284 | Boie | July 19, 1938 |
| 2,138,997 | Bradley | Dec. 6, 1938 |
| 2,167,466 | Shawhan et al. | July 25, 1939 |
| 2,295,982 | Widman | Sept. 15, 1942 |
| 2,300,687 | Nagle | Nov. 3, 1942 |
| 2,304,849 | Ruthman | Dec. 15, 1942 |
| 2,451,144 | Aubrey | Oct. 12, 1948 |
| 2,484,277 | Fisher | Oct. 11, 1949 |
| 2,650,080 | Harker et al. | Aug. 25, 1953 |
| 2,661,094 | Stewart | Dec. 1, 1953 |
| 2,805,844 | McMaster | Sept. 10, 1957 |

FOREIGN PATENTS

| | | |
|---|---|---|
| 832,578 | France | July 4, 1938 |